US006534346B2

(12) United States Patent
Kosokabe

(10) Patent No.: US 6,534,346 B2
(45) Date of Patent: Mar. 18, 2003

(54) GLASS AND GLASS TUBE FOR ENCAPSULATING SEMICONDUCTORS

(75) Inventor: Hiroyuki Kosokabe, Yamagata (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 09/853,605

(22) Filed: May 14, 2001

(65) Prior Publication Data

US 2002/0001881 A1 Jan. 3, 2002

(30) Foreign Application Priority Data

May 16, 2000 (JP) .................................. 2000-143990

(51) Int. Cl.$^7$ ............................................. H01L 21/44
(52) U.S. Cl. ............................................. 438/127
(58) Field of Search ........................ 501/11, 15, 18, 501/53, 55; 438/127, 106, 112, 124, 126

(56) References Cited

U.S. PATENT DOCUMENTS

| | | | | |
|---|---|---|---|---|
| 3,723,835 A | * | 3/1973 | Davis et al. | 317/234 R |
| 3,818,118 A | * | 6/1974 | Bennett et al. | 174/52 S |
| 3,906,147 A | * | 9/1975 | Pirooz | 174/84 R |
| 4,199,364 A | * | 4/1980 | Neely | 106/50 |
| 4,349,635 A | * | 9/1982 | Davis et al. | 501/15 |
| 4,446,502 A | * | 5/1984 | Boser et al. | 361/308 |
| 5,051,218 A | * | 9/1991 | Matthews | 264/40.6 |
| 5,420,757 A | * | 5/1995 | Eberhardt et al. | 361/813 |
| 5,491,111 A | * | 2/1996 | Tai | 437/209 |
| 5,750,926 A | * | 5/1998 | Schulman et al. | 174/52.3 |
| 5,904,555 A | * | 5/1999 | Darbha et al. | 438/613 |
| 6,118,216 A | * | 9/2000 | Marlor | 313/636 |
| 6,225,244 B1 | * | 5/2001 | Oguma | 501/45 |
| 6,251,813 B1 | * | 6/2001 | Sato | 501/78 |

FOREIGN PATENT DOCUMENTS

| | | |
|---|---|---|
| DE | 251 967 A1 | 12/1987 |
| EP | 0 900 768 A1 | 3/1999 |

OTHER PUBLICATIONS

Derwent Abstract, 1992–225098.
Derwent Abstract, 1991–277670.

* cited by examiner

Primary Examiner—Michael Sherry
Assistant Examiner—Scott Geyer
(74) Attorney, Agent, or Firm—Nixon & Vanderhye

(57) ABSTRACT

Glass, for encapsulating a semiconductor, which is substantially free of lead or other harmful ingredients, but which exhibits a sealing temperature of not higher than 710° C., and which stably seals with Dumet. Further, when the glass has a viscosity of $10^6$ dPa·s, the temperature of said glass is not higher than 710° C., and includes two or more of $Li_2O$, $Na_2O$ and $K_2O$ and $B_2O_3$. Also, the glass may comprise: $SiO_2$, $B_2O_3$ and $Al_2O_3$ in an amount of from 40 to 70%, from 5 to 20% and from 0 to 15% by weight, respectively; MgO, CaO, SrO, BaO and ZnO in a total amount of from 0 to 45% by weight; and $Li_2O$, $Na_2O$ and $K_2O$ in a total amount of from 5 to 25% by weight.

5 Claims, No Drawings

GLASS AND GLASS TUBE FOR ENCAPSULATING SEMICONDUCTORS

FIELD OF THE INVENTION

The present invention relates to glass for encapsulating a semiconductor. More particularly, the present invention relates to glass for hermetically encapsulating an element such as silicon diode, a light-emitting diode, a thermistor, and an electrode material such as Dumet wire for electrically connecting these elements, and relates to a glass encapsulator for encapsulating a semiconductor prepared therefrom.

BACKGROUND OF THE INVENTION

A small-sized electronic semiconductor part, such as silicon diode, a light-emitting diode, and a thermistor, is normally in DHD (Double Heat Sink Diode) form. In more detail, such a semiconductor element is clamped between electrode materials such as Dumet wire, and then is surrounded by a glass tube. The entire assembly is then heated to a predetermined temperature so that the glass tube softens and deforms to effect an hermetic seal. In general, this heating temperature is the value at which the viscosity of glass reaches $10^6$ dPa·s and is referred to as "sealing temperature". The sealing temperature of glass is required to be not higher than the maximum allowable temperature of the semiconductor to be encapsulated so that the electrical properties of the semiconductor are not impaired by the heating temperature. The maximum allowable temperature of semiconductors varies with type and design. Since semiconductors exhibit a maximum allowable temperature of about 710° C. at the most, it is important that the sealing temperature of the glass is not higher than 710° C. Another requirement for the glass relates to its thermal expansion coefficient. This requirement is that the thermal expansion coefficient of the glass should conform to that of Dumet wire, which most commonly is used as an electrode material. In more detail, the thermal expansion coefficient of the glass needs to be from $85 \times 10^{-7}$ to $105 \times 10^{-7}$/° C. at a temperature of from 30° C. to 380° C.

Glass that has heretofore been used for encapsulating a semiconductor and that meets above-described requirements was lead silicate glass containing PbO in an amount as great as 45 to 75% by weight. This is because PbO has an extremely great effect of lowering the viscosity of glass while forming stable silicate glass. For example, glass, for encapsulating a semiconductor, containing PbO in an amount of 46% by weight exhibits a sealing temperature of about 700° C. Glass, for encapsulating a semiconductor, containing PbO in an amount of 60% by weight exhibits a sealing temperature of about 655° C.

In recent years, environmental pollution by harmful ingredients, such as lead, cadmium, and arsenic, has been an issue. It has been required that industrial products be free of these harmful ingredients. In the industry of electronic parts, too, it has been positively endeavored to practice the use of lead-free solder. Further, it has been desired that glass for encapsulating a semiconductor be free of PbO.

An attempt to remove lead from lead glass, which can be used as a constituent of electrical apparatus and electronic parts to seal stably with Dumet, is disclosed in JP-A-6-206737 (the term "JP-A" as used herein means an "unexamined published Japanese patent application"). However, the target of this attempt is to render lead glass having a PbO content of from about 20 to 30% by weight. The glass having a Pbo content of from about 20% to 30% by weight is glass for sealing a bulb in fluorescent lighting or in an incandescent lamp. This glass material originally has a sealing temperature of about 750° C. In addition, the lead-free glass disclosed in the above cited JP-A-6-206737 exhibits a sealing temperature as high as about 790° C. Therefore, the glass material of the type disclosed above can by no means attain a sealing temperature of not higher than 710° C. as required for glass that encapsulates a semidonductor.

SUMMARY OF THE INVENTION

An object of the present invention is to provide glass, for encapsulating a semiconductor, which is substantially free of lead or other harmful ingredients, but which exhibits a sealing temperature of not higher than 710° C. and can be sealed stably with Dumet. Another object of the present invention is to provide is sealing glass encapsulator prepared from the above-described glass.

These and other objects of the present invention have been accomplished by glass, for encapsulating a semiconductor, comprising.

at least two of $Li_2O$, $Na_2O$ and $K_2O$; and $B_2O_3$, wherein said glass is free of lead, and wherein, when said glass has a viscosity of $10^6$ dPa·s, the temperature of said glass is not higher than 710° C.

Furthermore, these and other objects of the present invention have been accomplished by glass, for encapsulating a semiconductor, comprising:

$SiO_2$ in an amount of from 40 to 70% by weight;

$B_2O_3$ in an amount of from 5 to 20% by weight;

$Al_2O_3$ in an amount of from 0 to 15% by weight;

MgO, CaO, SrO, BaO and ZnO in a total amount of from 0 to 45% by weight; and at least two of $Li_2O$, $Na_2O$ and $K_2O$ in a total amount of from 5 to 25% by weight, each based on the total amount of said glass.

Moreover, these and other objects of the present invention have been accomplished by a glass encapsulator, for encapsulating a semiconductor, comprising glass including:

at least two of $Li_2O$, $Na_2O$ and $K_2O$; and $B_2O_3$, wherein said glass is free of lead, and wherein, when said glass has a viscosity of $10^6$ dPa·s, the temperature of said glass is not higher than 710° C.

Also, these and other objects of the present invention have been accomplished by a glass encapsulator, for encapsulating a semiconductor, comprising glass including:

$SiO_2$ in an amount of from 40 to 70% by weight;

$B_2O_3$ in an amount of from 5 to 20% by weight;

$Al_2O_3$ in an amount of from 0 to 15% by weight;

MgO, CaO, SrO, BaO and ZnO in a total amount of from 0 to 45% by weight; and at least two of $Li_2O$, $Na_2O$ and $K_2O$ in a total amount of from 5 to 25% by weight, each based on the total amount of said glass.

Furthermore, these and other objects of the present invention have been accomplished by a method for encapsulating a semiconductor element, comprising encapsulating the semiconductor element with an encapsulator, using a glass tube made of above-mentioned glass.

DETAILED DESCRIPTION OF THE INVENTION

Unless otherwise indicated, the term "%" hereinafter means "% by weight" based on the total amount of glass.

The expression "X is contained in an amount of from 0 to Y %" means that X is either not present, or is higher than 0% and up to Y %.

Glass, for encapsulating a semiconductor, according to the present invention is substantially free of PbO. Specifically, the content of PbO is not more than 5000 ppm, preferably is not more than 1000 ppm, still more preferably is not more than 500 ppm based on the total amount of the glass.

The glass, for encapsulating a semiconductor, according to the present invention comprises, as essential components, $B_2O_3$ and at least two of $Li_2O$, $Na_2O$ and $K_2O$ to have a lowered viscosity that allows encapsulation at a temperature of not higher than 710° C. In order to seal with Dumet, the thermal expansion coefficient of the glass at a temperature of from 30° C. to 380° C. is preferably from $85 \times 10^{-7}$ to $105 \times 10^{-7}$/° C.

The glass, for encapsulating a semiconductor, having the foregoing properties preferably comprises: $SiO_2$, $B_2O_3$ and $Al_2O_3$ in an amount of from 40 to 70%, from 5 to 20% and from 0 to 15%, respectively; MgO, CaO, SrO, BaO and ZnO in a total amount of from 0 to 45%; and $Li_2O$, $Na_2O$ and $K_2O$ in a total amount of from 5 to 25%.

The reason why the content of the various components is defined as mentioned above will be described hereinafter.

$SiO_2$ is a main component for constituting the network of the glass. The content of $SiO_2$ is preferably from 40 to 70%, more preferably is from 45 to 70%, and still more preferably is from 50 to 65%. When the content of $SiO_2$ is not higher than 70%, it is suitable for mass production since the material melts easily. Further, the resulting glass has appropriate (i.e., not too small) thermal expansion coefficient to be suited to that of Dumet, making itself readily sealable with Dumet. On the other hand, when the content of $SiO_2$ is not lower than 40%, the resulting glass maintains a superior chemical durability. When exposed to various chemicals used during the production of electronic parts, or when used as an electronic part over an extended period of time, a glass having a low chemical durability deteriorates, causing the drop of reliability of the electronic parts due to, for example damage and loss of hermeticity. Further, the resulting glass has appropriate (i.e., not too great) thermal expansion coefficient to be suited to that of Dumet, making itself readily sealable with Dumet.

$B_2O_3$ is a component that improves the meltability of glass, lowers the sealing temperature of glass, and enhances the chemical durability of glass. The content of $B_2O_3$ is preferably from 5 to 20%, more preferably is from 8 to 15%, and still more preferably is from 10 to 15%. When the content of $B_2O_3$ is not higher than 20%, the evaporation of $B_2O_3$ from the molten glass can be suppressed, thereby making it possible to obtain homogeneous glass. Further, the resulting glass maintains a superior chemical durability. On the other hand, when the content of $B_2O_3$ is not lower than 5%, the resulting glass exhibits appropriate viscosity and it is possible to obtain a encapsulator having good hermeticity.

$Al_2O_3$ is a component for improving the chemical durability of glass. The content of $Al_2O_3$ is preferably from 0 to 15%, and more preferably is from 0.5 to 10%. When the content of $Al_2O_3$ is not higher than 15%, it is suitable for mass production. Further, the resulting glass maintains a superior resistance to devitrification, thereby making it possible to obtain a glass free from stones or cords. The presence of stones or cords in glass makes the sealed shape uneven, or causes damage of the sealed electronic parts, giving a drastic drop of reliability of the sealed electronic parts.

MgO, CaO, SrO, BaO and ZnO lower the viscosity of the molten glass, thereby facilitating the melting of glass and, hence, lower the sealing temperature. These components further have the effect of enhancing the chemical durability of the glass. The total content of MgO, CaO, SrO, BaO and ZnO is preferably from 0 to 45%, more preferably is from 0 to 25%, still more preferably is from 1 to 25%, still further more preferably is from 1 to 20%, and most preferably is from 5 to 20%. When the total content of these components is not higher than 45%, it is possible to obtain a glass having a high homogeneity.

The contents of MgO, CaO, SrO and ZnO are preferably from 0 to 10%, from 0 to 10%, from 0 to 20% and from 0 to 15%, respectively, and more preferably are from 0 to 8%, from 0 to 8%, from 0 to 15% and from 1 to 15%, respectively. When the content of each various component is not higher than its above defined range, it is possible to obtain a glass having a high homogeneity.

$Li_2O$, $Na_2O$ and $K_2O$, which are oxides of alkali metals, are components for facilitating the melting of glass, thereby making it possible to attain a sealing temperature of not higher than 710° C., and to attain a thermal expansion coefficient required to seal Dumet. It is important to use at least two of these oxides of alkali metals in admixture. In other words, the higher the content of oxides of alkali metal is, the lower the sealing temperature is but the poorer are the weathering resistance and electrical insulation of the resulting glass are. Therefore, in order to make use of the mixing effect of oxides of alkaline metal, at least two of these oxides of alkali metals may be used in admixture to improve weathering resistance and electrical insulation of the glass.

The total content of these oxides of alkaline metal is preferably from 5 to 25%, more preferably is from 10 to 25%, and still more preferably is from 14 to 20%. When the total content of these oxides of alkaline metal is not higher than 25%, the resulting glass has an appropriate thermal expansion coefficient to be suited to that of Dumet, thereby making itself readily sealable with Dumet, and it is possible to obtain a encapsulator having good hermeticity. Further, the resulting glass maintains chemical durability. On the other hand, when the total content of these oxides of alkaline metal is not lower than 5%, a low sealing temperature can be attained. Further, the resulting glass exhibits appropriate thermal expansion coefficient. The contents of $Li_2O$, $Na_2O$ and $K_2O$ are preferably from 0 to 10%, from 0 to 10% and from 0 to 15%, respectively, and more preferably are from 0.5 to 9%, from 0 to 9% and from 1 to 10%, respectively. When the content of each $Li_2O$ and $Na_2O$ independently, is not higher than 10% and the content of $K_2O$ is not higher than 15%, the mixing effect of alkalis is effective, thereby maintaining a superior weathering resistance and high electrical insulation. $Li_2O$ has the highest effect of lowering the sealing temperature of glass. Thus, the content of $Li_2O$ is preferably not lower than 0.5%, particularly not lower than 3%.

In addition to the foregoing components, components, such as $ZrO_2$, $TiO_2$, $P_2O_5$, $Fe_2O_3$, $SO_3$, $Sb_2O_3$, F, and Cl, may be added to the glass composition in a proper amount for the purpose of adjusting the viscosity of the glass and for improving the weathering resistance, meltability, and refining, of the glass.

When a glass material for encapsulating semiconductor loses its resistivity, a slight current of electricity flows between the electrodes to form a circuit comprising a resistor disposed parallel to the diode. Thus, the volume resistivity of the glass material is preferably as high as possible. In some detail, the volume resistivity of the glass material at 150° C. is 7 or higher, preferably 9 or higher, more preferably 10 or higher as calculated in terms of (log ρ, Ω·cm). In order to make the best use of the diode at a temperature as high as about 200° C., it is preferred that the resistivity (log ρ, Ω·cm) of the glass material at 250° C. be 7 or higher.

The process for the preparation of the encapsulator for encapsulating semiconductor made of the glass material for encapsulating semiconductor of the invention will be described hereinafter.

A process for the preparation of an encapsulator on an industrial basis comprises a compounding step of measuring and mixing minerals or produced crystal powder containing components constituting glass to prepare a starting material to be charged into a furnace, a melting step of melting and vitrifying the starting material, a forming step of forming the molten glass into a tube, and a processing step of cutting the tube into a predetermined size.

Firstly, starting materials of glass are compounded. The starting materials comprise minerals made of a plurality of components such as oxide and carbonate and impurities. These components may be compounded taking into account the results of analysis. Thus, these components are not limited. These components are measured out, and then stirred by a proper mixer corresponding to the scale of production such as V-shaped mixer, rocking mixer and mixer with agitating blades to obtain a starting material to be charged into a furnace.

Subsequently, the starting material is charged into a glass melting furnace to undergo vitrification. The melting furnace comprises a melting bath for melting and vitrifying the starting materials, a refining bath for raising bubbles in the glass to remove them, and a passage (feeder) for lowering the viscosity of the glass thus refined to a proper value and then introducing the glass into a forming device. The melting furnace is made of a refractory or a furnace lined with platinum on the inner side thereof. The melting furnace generates heat with a burner or by electrically energizing the glass. The starting material thus charged is normally vitrified at a temperature of from 1,300° C. to 1,600° C. in the melting bath. The glass is then introduced into the refining bath at a temperature of from 1,400° C. to 1,600° C. so that bubbles in the glass rise and disappear. While passing through the feeder, the glass material shows a temperature drop that changes its viscosity to a range of from $10^4$ to $10^6$ dPa·s, which is suitable for glass formation. The glass is then introduced into the forming device.

Subsequently, the glass material is formed into a tube by the forming device. As the forming device there may be used Danner process, Vello process, down draw process, or up draw process.

Thereafter, by cutting the glass tube into a predetermined size, an encapsulator for encapsulating semiconductor can be obtained. The cutting of the glass tube can be carried out by cutting glass tubes one by one by a diamond cutter. In practice, however, a process suitable for mass production is normally used which comprises tying a plurality of glass tubes into a bundle, and then cutting the bundle by a diamond wheel cutter so that a plurality of glass tubes can be cut at once.

How to use the glass for encapsulating a semiconductor, according to the invention, will be described hereinafter.

The glass according to the invention can be normally used in the form of a formed glass encapsulator having a predetermined size. Therefore, a glass encapsulator having the foregoing properties (and formulation) is firstly prepared. Subsequently, a semiconductor, clamped between electrode materials such as Dumet wire, is put in the glass encapsulator using a jig. Thereafter, the entire assembly is heated to a temperature of not higher than 710° C. so that the glass encapsulator softens and deforms to effect a hermetic seal. In this manner, a small-sized electronic part, such as a silicon diode, a light-emitting diode, and a thermistor, can be prepared. The glass material of the invention can be used not only as glass tube but also as glass powder. The glass material, if it is in the form of powder, is dispersed in an alcohol or water as a solvent to form a slurry. The slurry is then dropped onto an element clamped between Dumet wires while the element is being rotated so that the slurry is wound on the element. Thereafter, the element is calcined to hermetically encapsulate the semiconductor.

The glass for encapsulating a semiconductor, according to the invention, will be further described in the following examples. However, the present invention should not be construed as being limited to the following examples.

Tables 1 to 5 show the data of the examples of the invention (Sample Nos. 1 to 26), and show comparative examples (Sample Nos. 27 and 28). Sample No. 27 is conventional lead-containing glass for encapsulating a semiconductor, and Sample No. 28 is lead-free glass described in JP-A-6-206737.

TABLE 1

| | Example Nos. | | | | |
|---|---|---|---|---|---|
| | 1 | 2 | 3 | 4 | 5 |
| $SiO_2$ | 62.7 | 63.0 | 62.7 | 62.7 | 62.7 |
| $Al_2O_2$ | 6.0 | 6.0 | 6.0 | 6.0 | 6.0 |
| $B_2O_3$ | 10.4 | 10.4 | 10.4 | 10.4 | 10.4 |
| MgO | — | — | — | 2.0 | — |
| CaO | — | — | — | — | 2.0 |
| ZnO | 2.1 | 2.1 | 2.1 | 2.1 | 2.17 |
| $Li_2O$ | 6.2 | 4.2 | 4.2 | 4.2 | 4.2 |
| $Na_2O$ | 7.3 | 9.3 | 7.3 | 7.3 | 7.3 |
| $K_2O$ | 5.0 | 5.0 | 7.0 | 5.0 | 5.0 |
| $Sb_2O_3$ | 0.3 | — | 0.3 | 0.3 | 0.3 |
| (%, respectively) | | | | | |
| Thermal expansion coefficient ($\times 10^{-7}$/° C.) | 95.5 | 93.8 | 92.2 | 88.1 | 88.3 |
| Softening point (° C.) | 597 | 615 | 621 | 620 | 622 |
| Temperature (° C.) corresponding to viscosity of $10^6$ dPa·s | 669 | 692 | 700 | 700 | 699 |
| Working point (° C.) | 820 | 852 | 866 | 869 | 860 |
| Volume resistivity (log ρ, Ω·cm) | | | | | |
| 150° C. | 9.8 | 10.2 | 10.6 | 10.5 | 10.6 |
| 250° C. | 7.3 | 7.7 | 8.0 | 7.9 | 8.0 |

TABLE 2

| | Example Nos. | | | | |
|---|---|---|---|---|---|
| | 6 | 7 | 8 | 9 | 10 |
| $SiO_2$ | 62.7 | 62.7 | 62.7 | 62.7 | 54.7 |
| $Al_2O_2$ | 6.0 | 6.0 | 6.0 | 6.0 | 6.0 |
| $B_2O_3$ | 10.4 | 10.4 | 10.4 | 10.4 | 10.4 |
| SrO | 2.0 | — | — | — | 10.0 |
| BaO | — | 2.0 | — | — | — |
| ZnO | 2.1 | 2.1 | 4.1 | 2.1 | 2.1 |
| $Li_2O$ | 4.2 | 4.2 | 4.2 | 4.2 | 4.2 |
| $Na_2O$ | 7.3 | 7.3 | 7.3 | 7.3 | 7.3 |
| $K_2O$ | 5.0 | 5.0 | 5.0 | 5.0 | 5.0 |

TABLE 2-continued

| | Example Nos. | | | | |
|---|---|---|---|---|---|
| | 6 | 7 | 8 | 9 | 10 |
| $Fe_2O_3$ | — | — | — | 2.0 | — |
| $Sb_2O_3$ | 0.3 | 0.3 | 0.3 | 0.3 | 0.3 |
| (%, respectively) | | | | | |
| Thermal expansion coefficient ($\times 10^{-7}$/° C.) | 87.9 | 87.4 | 87.0 | 86.7 | 97.8 |
| Softening point (° C.) | 622 | 625 | 623 | 621 | 606 |
| Temperature (° C.) corresponding to viscosity of $10^6$ dPa · s | 701 | 704 | 703 | 701 | 674 |
| Working point (° C.) | 867 | 870 | 868 | 871 | 811 |
| Volume resistivity (log ρ, Ω · cm) | | | | | |
| 150° C. | 10.5 | 10.5 | 10.4 | 10.4 | 11.3 |
| 250° C. | 7.9 | 7.9 | 7.8 | 7.8 | 8.6 |

TABLE 3

| | Example Nos. | | | | |
|---|---|---|---|---|---|
| | 11 | 12 | 13 | 14 | 15 |
| $SiO_2$ | 62.7 | 50.7 | 50.7 | 51.7 | 54.7 |
| $Al_2O_2$ | 4.0 | 5.0 | 5.0 | 9.0 | 6.0 |
| $B_2O_3$ | 12.4 | 10.0 | 10.0 | 10.4 | 10.4 |
| MgO | — | — | 5.0 | — | — |
| CaO | — | — | 5.0 | — | — |
| SrO | — | 10.0 | 10.0 | 10.0 | 7.0 |
| BaO | — | 10.0 | — | — | — |
| ZnO | 2.1 | — | — | 2.1 | 5.1 |
| $Li_2O$ | 4.2 | 3.0 | 3.0 | 4.2 | 4.2 |
| $Na_2O$ | 7.3 | 3.0 | 3.0 | 7.3 | 7.3 |
| $K_2O$ | 7.0 | 8.0 | 8.0 | 5.0 | 5.0 |
| $Sb_2O_3$ | 0.3 | 0.3 | 0.3 | 0.3 | 0.3 |
| (%, respectively) | | | | | |
| Thermal expansion coefficient ($\times 10^{-7}$/° C.) | 91.3 | 92.6 | 92.3 | 99.1 | 97.2 |
| Softening point (° C.) | 620 | 638 | 638 | 603 | 603 |
| Temperature (° C.) corresponding to viscosity of $10^6$ dPa · s | 696 | 707 | 706 | 671 | 670 |
| Working point (° C.) | 851 | 845 | 840 | 812 | 809 |
| Volume resistivity (log ρ, Ω · cm) | | | | | |
| 150° C. | 10.7 | 13.1 | 12.1 | 11.2 | 11.1 |
| 250° C. | 8.1 | 10.1 | 9.2 | 8.5 | 8.5 |

TABLE 4

| | Example Nos. | | | | |
|---|---|---|---|---|---|
| | 16 | 17 | 18 | 19 | 20 |
| $SiO_2$ | 57.7 | 55.7 | 54.7 | 57.7 | 54.7 |
| $Al_2O_2$ | 6.0 | 6.0 | 4.0 | 4.0 | 4.0 |
| $B_2O_3$ | 10.4 | 10.4 | 12.4 | 12.4 | 12.4 |
| MgO | — | — | — | 1.0 | — |
| CaO | 1.0 | — | — | 1.0 | — |
| SrO | 1.0 | 5.0 | 7.0 | 1.0 | 3.5 |
| BaO | 1.0 | — | — | — | 3.5 |
| ZnO | 4.1 | 4.1 | 5.1 | 4.1 | 5.1 |
| $Li_2O$ | 5.2 | 5.2 | 4.2 | 5.2 | 4.2 |
| $Na_2O$ | 7.3 | 7.3 | 7.3 | 7.3 | 7.3 |
| $K_2O$ | 6.0 | 6.0 | 5.0 | 6.0 | 5.0 |
| $Sb_2O_3$ | 0.3 | 0.3 | 0.3 | 0.3 | 0.3 |
| (%, respectively) | | | | | |
| Thermal expansion coefficient ($\times 10^{-7}$/° C.) | 99.9 | 102.4 | 97.1 | 99.1 | 96.1 |
| Softening point (° C.) | 591 | 587 | 601 | 590 | 600 |

TABLE 4-continued

| | Example Nos. | | | | |
|---|---|---|---|---|---|
| | 16 | 17 | 18 | 19 | 20 |
| Temperature (° C.) corresponding to viscosity of $10^6$ dPa · s | 660 | 652 | 665 | 654 | 667 |
| Working point (° C.) | 802 | 786 | 794 | 786 | 800 |
| Volume resistivity (log ρ, Ω · cm) | | | | | |
| 150° C. | 10.7 | 10.9 | 11.4 | 11.2 | 11.4 |
| 250° C. | 8.1 | 8.2 | 8.6 | 8.4 | 8.6 |

TABLE 5

| | Example Nos. | | | | |
|---|---|---|---|---|---|
| | 21 | 22 | 23 | 24 | 25 |
| $SiO_2$ | 53.7 | 58.7 | 55.2 | 53.7 | 53.7 |
| $Al_2O_2$ | 4.0 | 4.0 | 2.5 | 2.5 | 2.5 |
| $B_2O_3$ | 12.4 | 12.4 | 12.4 | 12.4 | 12.4 |
| MgO | 1.0 | 1.0 | 1.0 | 1.0 | 1.0 |
| CaO | 1.0 | 1.0 | 1.0 | 1.0 | 1.0 |
| SrO | 7.0 | 1.0 | 7.0 | 7.0 | 7.0 |
| ZnO | 5.1 | 4.1 | 5.1 | 5.1 | 5.1 |
| $Li_2O$ | 4.2 | 5.2 | 4.2 | 4.2 | 4.2 |
| $Na_2O$ | 6.3 | 6.3 | 6.3 | 6.3 | 6.3 |
| $K_2O$ | 5.0 | 6.0 | 5.0 | 5.0 | 5.0 |
| $TiO_2$ | — | — | — | 1.5 | — |
| $ZrO_2$ | — | — | — | — | 1.5 |
| $Sb_2O_3$ | 0.3 | 0.3 | 0.3 | 0.3 | 0.3 |
| (%, respectively) | | | | | |
| Thermal expansion coefficient ($\times 10^{-7}$/° C.) | 94.1 | 94.4 | 94.9 | 95.1 | 94.1 |
| Softening point (° C.) | 602 | 596 | 604 | 603 | 607 |
| Temperature (° C.) corresponding to viscosity of $10^6$ dPa · s | 669 | 662 | 668 | 665 | 671 |
| Working point (° C.) | 797 | 797 | 795 | 788 | 798 |
| Volume resistivity (log ρ, Ω · cm) | | | | | |
| 150° C. | 11.5 | 10.8 | 11.6 | 11.6 | 11.6 |
| 250° C. | 8.8 | 8.2 | 8.9 | 8.9 | 8.8 |

TABLE 6

| | Example No. | Comparative Example Nos. | |
|---|---|---|---|
| | 26 | 27 | 28 |
| $SiO_2$ | 58.7 | 35.0 | 68.0 |
| $Al_2O_2$ | 4.0 | — | 3.4 |
| $B_2O_3$ | 12.4 | — | — |
| MgO | 1.0 | — | 1.3 |
| CaO | 1.0 | — | 1.9 |
| SrO | 1.0 | — | 2.9 |
| BaO | — | — | 8.7 |
| ZnO | 4.1 | — | — |
| $Li_2O$ | 8.5 | — | 1.2 |
| $Na_2O$ | — | — | 7.4 |
| $K_2O$ | 9.0 | 4.5 | 5.0 |
| PbO | — | 60.0 | — |
| $Sb_2O_3$ | 0.3 | 0.3 | — |
| $SO_3$ | — | — | 0.1 |
| (%, respectively) | | | |
| Thermal expansion coefficient ($\times 10^{-7}$/° C.) | 91.9 | 91.0 | 93.0 |
| Softening point (° C.) | 590 | 575 | 675 |
| Temperature (° C.) corresponding to viscosity | 651 | 660 | 788 |

TABLE 6-continued

|  | Example No. | Comparative Example Nos. | |
|---|---|---|---|
|  | 26 | 27 | 28 |
| of $10^6$ dPa·s |  |  |  |
| Working point (° C.) | 775 | 820 | 1,020 |
| Volume resistivity (log ρ, Ω·cm) |  |  |  |
| 150° C. | 9.5 | 14.8 | No data |
| 250° C. | 7.2 | 11.7 | 8.9 |

To evaluate the characteristics of the glass, the various samples shown in the tables above were prepared in the following manner.

First, glass materials having the formulation set forth in the tables above were each prepared, and then melted at a temperature of 1,400° C. in a platinum crucible for 5 hours. Each of the molten glass materials thus obtained was then molded and worked into a predetermined shape to prepare the various glass samples.

Each of the various samples was then measured for thermal expansion coefficient, softening point, temperature corresponding to viscosity of $10^6$ dPa·s (sealing temperature), working - point, and volume resistivity (150° C., 250° C.). The results are set forth in the tables above.

As can be seen in the tables above, Sample Nos. 1 to 26, according to the invention, exhibited a sealing temperature of not higher than 710° C., and exhibited a thermal expansion coefficient of from $86.7 \times 10^{-7}$ to $102.4 \times 10^{-7}/°$ C. On the other hand, Comparative Sample No. 28 exhibited a thermal expansion coefficient of $93 \times 10^{-7}/°$ C. allowing safe sealing with Dumet, but also exhibited a sealing temperature as high as 788° C. Thus, Comparative Sample No. 28 was confirmed to be unsuitable for encapsulating a semiconductor.

To measure thermal expansion coefficient, in the tables above, the glass sample was worked into a column having a diameter of about 3 mm and a length of about 50 mm. The columnar sample was then measured for an average linear thermal expansion coefficient within a temperature range of from 30° C. to 380° C. by way of a self-recording differential thermal dilatometer.

The softening point, the temperature corresponding to viscosity of $10^6$ dPa·s (sealing temperature), and the working point were determined in the following manner. First, the softening point of the glass was determined by a fiber method according to ASTM C338. The temperature corresponding to the viscosity within the range of the working point was then determined by a platinum bulb withdrawal method. Subsequently, the values of temperature and viscosity were applied to Fulcher's equation to calculate the temperature at which the viscosity reaches $10^6$ dPa·s, i.e., the sealing temperature.

The volume resistivity was measured by a method according to ASTM C-657. The glass for encapsulating a semiconductor preferably has a high insulation.

As mentioned above, the glass, for encapsulating a semiconductor, according to the invention is fully free of PbO but exhibits a thermal expansion coefficient of from $85 \times 10^{-7}$ to $105 \times 10^{-7}/°$ C., which is suited to seal with Dumet, and also exhibits a sealing temperature of not higher than 710° C., whereby it is thus useful as glass, in particular a glass encapsulator, for encapsulating a semiconductor.

An encapsulator for encapsulating semiconductor is prepared from a glass material of the invention.

Firstly, silica flour, aluminum oxide, boric acid, magnesium oxide, calcium carbonate, zinc oxide, lithium carbonate, sodium carbonate, potassium carbonate, antimony trioxide, strontium carbonate, barium carbonate, iron oxide, titanium oxide, zirconium oxide are compounded in a predetermined proportion according to a formulation determined taking into account the yield and the amount of impurities to prepare 500 kg of a starting material which is then thoroughly stirred by a V-shaped mixer.

The starting material thus prepared is melted in a 500 l capacity glass melting furnace, formed into a tube by down draw process, and then cut to obtain a glass tube having a proper length (e.g., 1 m). The melting bath of the glass melting furnace is kept at a temperature of 1,450° C. The molten glass which comes from the melting bath passes through the refining bath and then enters into the feeder. The molten glass in the feeder flows out through the gap between the Orifice ring at the bottom of the feeder and the Bel shaft disposed concentrically of the orifice ring, which constitute a forming device. The glass is stretched downward while being subject to air pressure developed by air blown from the Bel shaft to form a tube. The required dimension of the tube (inner diameter and thickness) is determined by the rate at which the glass material flows down, air pressure and rate of pulling.

Subsequently, using a binding device, 1,000 glass tubes thus formed are integrated. The bundle of glass tubes is dipped in a resin bath so that a resin such as pine resin enters into the gap between the glass tubes, withdrawn from the resin bath, and then cooled to obtain a rod-like material having a diameter of about 5 cm. The rod-like material is then cut into a predetermined length. Thus, a pellet comprising 1,000 glass tubes integrally combined to each other is obtained by one cutting. Thereafter, the resin is removed from the combination to unbind the tubes. These tubes are washed, and then dried to obtain encapsulators having a predetermined length. The encapsulator thus obtained, if it is adapted for diode, has an inner diameter of from 0.6 to 2.1 mm, a thickness of from 0.2 to 0.8 mm and a length of from 1 to 4 mm.

The use of a glass encapsulator, for encapsulating a semiconductor, according to the invention makes it possible to render a small-sized electronic part, such as a silicon diode, a light-emitting diode, and a thermistor, free of lead.

While the invention has been described in detail and with reference to specific embodiments thereof, it will be apparent to one skilled in the art that various changes and modifications can be made therein without departing from the spirit and scope thereof.

This application is based on Japanese patent application No. 2000-143990 filed on May 16, 2000, the entire content of which is incorporated herein by reference.

What is claimed is:

1. An encapsulator, for encapsulating a semiconductor, wherein the encapsulator is in the form of a glass tube and capable of hermetically encapsulating the semiconductor which is clamped by an electrode material in the glass tube, and wherein the encapsulator comprises a glass tube including:

$SiO_2$ in an amount of from 40 to 70% by weight;

$B_2O_3$ in an amount of from 5 to 20% by weight;

$Al_2O_3$ in an amount of from 0 to 10% by weight;

MgO, CaO, SrO, BaO and ZnO in a total amount of from 0 to 45% by weight; and at least two of $Li_2O$, $Na_2O$ and $K_2O$ in a total amount of from 5 to 25% by weight, each based on the total amount of said glass, wherein said glass tube is free of lead.

2. The encapsulator, for encapsulating a semiconductor, according to claim 1, wherein the glass tube is produced by:

melting a glass material to prepare molten glass;

forming the molten glass to be a glass tube;

cutting the glass tube to have a predetermined size, wherein the glass material is prepared to give the glass tube including:
$SiO_2$ in an amount of from 40 to 70% by weight;
$B_2O_3$ in an amount of from 5 to 20% by weight;
$Al_2O_3$ in an amount of from 0 to 10% by weight;
MgO, CaO, SrO, BaO and ZnO in a total amount of from 0 to 45% b weight; and
at least two of $Li_2O$, $Na_2O$ and $K_2O$ in a total amount of from 5 to 25% b weight,
each based on the total amount of said glass, wherein said glass tube is free of lead.

3. The encapsulator, for encapsulating a semiconductor, according to claim 1, wherein the glass tube includes:

$SiO_2$ in an amount of from 40 to 70% by weight;

$B_2O_3$ in an amount of from 5 to 20% by weight;

$Al_2O_3$ in an amount of from 0 to 10% by weight;

MgO, CaO, SrO, BaO and ZnO in a total amount of from 0 to 45% by weight;

at least two of $Li_2O$, $Na_2O$ and $K_2O$ in a total amount of from 5 to 25% by weight; and $TiO_2$ in an amount of from 0 to 1.5% by weight, each based on the total amount of said glass, wherein said glass tube is free of lead.

4. The encapsulator, for encapsulating a semiconductor, according to claim 1, wherein the glass tube includes:

$SiO_2$ in an amount of from 50.7 to 70% by weight;

$B_2O_3$ in an amount of from 5 to 20% by weight;

$Al_2O_3$ in an amount of from 0 to 10% by weight;

MgO, CaO, SrO, BaO and ZnO in a total amount of from 0 to 45% by weight; and at least two of $Li_2O$, $Na_2O$ and $K_2O$ in a total amount of from 5 to 25% by weight, each based on the total amount of said glass, wherein said glass tube is free of lead.

5. The encapsulator, for encapsulating a semiconductor, according to claim 1, wherein the glass tube includes:

$SiO_2$ in an amount of from 40 to 70% by weight;

$B_2O_3$ in an amount of from 5 to 20% by weight;

$Al_2O_3$ in an amount of from 0 to 10% by weight;

MgO, CaO, SrO, BaO and ZnO in a total amount of from 0 to 45% by weight;

SrO in an amount of from 1 to 20% by weight; and at least two of $Li_2O$, $Na_2O$ and $K_2O$ in a total amount of from 5 to 25% by weight, each based on the total amount of said glass, wherein said glass tube is free of lead.

* * * * *